(12) United States Patent
Rodgers et al.

(10) Patent No.: US 8,762,719 B2
(45) Date of Patent: *Jun. 24, 2014

(54) METHOD AND SYSTEM FOR COMMAND AUTHENTICATION TO ACHIEVE A SECURE INTERFACE

(75) Inventors: Stephane Rodgers, San Diego, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,834

(22) Filed: Sep. 13, 2012

(65) Prior Publication Data

US 2013/0007452 A1    Jan. 3, 2013

Related U.S. Application Data

(63) Continuation of application No. 11/558,662, filed on Nov. 10, 2006, now Pat. No. 8,285,988.

(60) Provisional application No. 60/798,943, filed on May 9, 2006.

(51) Int. Cl.
*H04L 9/32* (2006.01)

(52) U.S. Cl.
USPC ............................. 713/168; 380/28; 380/44

(58) Field of Classification Search
USPC ........ 713/168, 150, 171, 189; 380/44; 726/26
See application file for complete search history.

(56) References Cited

U.S. PATENT DOCUMENTS

| 5,003,593 A | 3/1991 | Mihm, Jr. |
| 5,022,076 A | 6/1991 | Rosenow et al. |
| 5,293,576 A | 3/1994 | Mihm, Jr. et al. |
| 5,896,499 A | 4/1999 | McKelvey |

(Continued)

FOREIGN PATENT DOCUMENTS

| CN | 1215528 | 4/1999 |
| CN | 1647532 | 7/2005 |
| CN | 1694397 | 11/2005 |

OTHER PUBLICATIONS

Office Action mailed Mar. 4, 2010 in U.S. Appl. No. 11/558,680, Rodgers et al., filed Nov. 10, 2006, 17 pages.

(Continued)

*Primary Examiner* — Amare F Tabor
(74) *Attorney, Agent, or Firm* — Sterne, Kessler, Goldstein & Fox P.L.L.C.

(57) ABSTRACT

Aspects of a method and system for command authentication to achieve a secure interface are provided. Command authentication between a host and a slave device in a multimedia system may be achieved by on-the-fly pairing or by an automatic one-time-programming via a security processor. In an on-the-fly pairing scheme, the host may generate a host key based on a host root key and host control words while the slave may generate slave key based the host key, a slave root key and slave control words. The slave key may be stored and later retrieved by the slave device to obtain the host key for authenticating host commands. The host may be disabled from generating and/or passing the host key to the slave. In an automatic one-time programming scheme, the security processor may burn a random number onto a onetime-programmable memory in the host and slave devices for command authentication.

21 Claims, 6 Drawing Sheets

(56) References Cited

U.S. PATENT DOCUMENTS

| | | | |
|---|---|---|---|
| 5,913,053 A | 6/1999 | Nonogaki et al. | |
| 6,158,004 A | 12/2000 | Mason et al. | |
| 6,167,521 A * | 12/2000 | Smith et al. | 726/21 |
| 6,363,444 B1 | 3/2002 | Platko et al. | |
| 6,385,317 B1 | 5/2002 | Rix et al. | |
| 6,795,905 B1 | 9/2004 | Ellison et al. | |
| 6,895,504 B1 | 5/2005 | Zhang et al. | |
| 6,959,089 B1 | 10/2005 | Spunk | |
| 7,152,166 B2 | 12/2006 | Strom et al. | |
| RE39,622 E * | 5/2007 | Kusakabe et al. | 713/169 |
| 7,228,439 B2 | 6/2007 | Sasselli | |
| 7,305,534 B2 | 12/2007 | Watt et al. | |
| 7,328,342 B2 | 2/2008 | Albanese et al. | |
| 7,370,201 B2 | 5/2008 | Arnoux | |
| 7,389,376 B2 | 6/2008 | Nakai | |
| 7,472,425 B2 * | 12/2008 | Suzuki et al. | 726/30 |
| 7,487,367 B2 | 2/2009 | Belnet et al. | |
| 7,539,865 B2 * | 5/2009 | Hatakeyama | 713/169 |
| 7,634,585 B2 | 12/2009 | Conley et al. | |
| 7,636,840 B2 | 12/2009 | Tang | |
| 7,831,827 B2 | 11/2010 | Walmsley | |
| 8,032,761 B2 | 10/2011 | Rodgers et al. | |
| 8,156,345 B2 | 4/2012 | Rodgers et al. | |
| 8,171,542 B2 * | 5/2012 | Tucker | 726/17 |
| 2001/0052070 A1 | 12/2001 | Oishi et al. | |
| 2004/0039924 A1 | 2/2004 | Baldwin et al. | |
| 2004/0078584 A1 | 4/2004 | Moroney et al. | |
| 2004/0083364 A1 | 4/2004 | Andreaux et al. | |
| 2004/0177261 A1 | 9/2004 | Watt et al. | |
| 2006/0033840 A1 | 2/2006 | Diehl et al. | |
| 2006/0034457 A1 | 2/2006 | Damgaard et al. | |
| 2006/0059369 A1 | 3/2006 | Fayad et al. | |
| 2006/0129806 A1 | 6/2006 | Walmsley | |
| 2006/0136717 A1 | 6/2006 | Buer et al. | |
| 2006/0136725 A1 | 6/2006 | Walmsley | |
| 2006/0161704 A1 | 7/2006 | Nystad et al. | |
| 2006/0174136 A1 | 8/2006 | Lyons et al. | |
| 2007/0041403 A1 | 2/2007 | Day et al. | |
| 2007/0056042 A1 | 3/2007 | Qawami et al. | |
| 2007/0106907 A1 | 5/2007 | Rainsard et al. | |
| 2007/0143601 A1 | 6/2007 | Arroyo et al. | |
| 2007/0174614 A1 | 7/2007 | Duane et al. | |
| 2007/0266232 A1 | 11/2007 | Rodgers et al. | |
| 2008/0104348 A1 | 5/2008 | Kabzinski et al. | |
| 2008/0109656 A1 | 5/2008 | Kotzin | |
| 2009/0092060 A1 | 4/2009 | Goto | |
| 2010/0005301 A1 | 1/2010 | Asano et al. | |

OTHER PUBLICATIONS

Office Action mailed Aug. 16, 2010 in U.S. Appl. No. 11/558,650, Rodgers et al., filed Nov. 10, 2006, 9 pages.
Office Action mailed Jan. 6, 2011 in U.S. Appl. No. 11/558,650, Rodgers et al., filed Nov. 10, 2006, 9 pages.
Office Action mailed Jan. 5, 2010 in U.S. Appl. No. 11/558,630, Rodgers et al., filed Nov. 10, 2006, 12 pages.
Office Action mailed Aug. 12, 2010 in U.S. Appl. No. 11/558,630, Rodgers et al., filed Nov. 10, 2006, 8 pages.
Office Action mailed Jan. 24, 2011 in U.S. Appl. No. 11/558,630, Rodgers et al., filed Nov. 10, 2006, 9 pages.
Notice of Allowance mailed May 31, 2011 in U.S. Appl. No. 11/558,630, Rodgers et al., filed Nov. 10, 2006, 7 pages.
Notice of Allowance mailed Dec. 8, 2011 in U.S. Appl. No. 13/252,484, Rodgers et al., filed Oct. 4, 2011, 5 pages.
Menezes, A et al. Handbook of Applied Cryptography, Key Management Techniques; Handbook of Applied Cryptography; 1996; pp. 543-590; XP002246921.

* cited by examiner

METHOD AND SYSTEM FOR COMMAND AUTHENTICATION TO ACHIEVE A SECURE INTERFACE

CROSS REFERENCE TO RELATED APPLICATIONS

This application is a continuation of U.S. patent application Ser. No. 11/558,662, filed Nov. 10, 2006, which claims benefit to U.S. Provisional Patent Application No. 60/798, 943, filed May 9, 2006, each of which is incorporated herein by reference in its entirety.

The subject matter of this application also relates to the following co-pending, commonly assigned applications:

U.S. patent application Ser. No. 11/558,650, filed Nov. 10, 2006;

U.S. patent application Ser. No. 11/558,630, filed on Nov. 10, 2006; and

Each of the above stated related applications is hereby incorporated by reference in its entirety.

FIELD OF THE INVENTION

Certain embodiments of the invention relate to securing information in multimedia systems. More specifically, certain embodiments of the invention relate to a method and system for command authentication to achieve a secure interface.

BACKGROUND OF THE INVENTION

In a multimedia system, such as a set-top box (STB), for example where multiple chips on a board communicate with each other, the security of the interfaces between these chips have to be considered in determining the overall security provided by the system. In particular, when one chip is a master device and another chip is a slave device, and when the communication between the master and slave devices occurs over an easily tapped or hijacked medium such as the PCI bus, for example, steps may need to be taken to ensure that the slave device may not be controlled by an unauthorized device. This may be especially important when, for example, the master or host device may be responsible for providing network conditional access (CA) decryption on video/audio data received by the multimedia system, and then re-encrypting the original data using a local copy-protection (CP) method before communicating the re-encrypted data to the slave device. In this instance, an unauthorized user may recover the video/audio data when the data communication between the host and slave devices is compromised. In this regard, an unauthorized user may attack the slave device instead of the higher security host device to recover the original video/audio data with the CA encryption removed.

In master-slave device configurations on a multimedia system board, for example, often the slave device has limited processing capabilities and may not be capable of providing a full software layer. In these instances, the host device may be utilized to configure the slave device via a plurality of commands sent over a generic interface, such as the PCI bus, for example. This may result in an additional level of exposure to unauthorized users since the slave device may not be capable of distinguishing when commands are being sent from the authorized host device or from an unauthorized host device. Without being able to make this distinction, the slave device may be configured by another device on the PCI bus, for example, regardless of the device's authorization status.

Authentication generally refers to the method by which the slave device may ensure that a command being sent to it comes from a legitimate or authorized host device. A slave device may be enabled to accept command from a single authorized device. A generally utilized approach for allowing the slave device to authenticate the host device is to use some sort of public key/private key protocol, where host commands may be signed using its private key, and which are then authenticated by the slave device using the public key. However, without a common shared secret, this type of authentication may be subject to a "man in the middle" attack, for example. In such an attack, a device on the common bus may write a public key to the slave device, where the public key may corresponds to the unauthorized device's own private key, and thus enable the unauthorized device to issue commands that may be considered "authenticated" by the slave device. Another problem with this approach is that the public/private key pair is common for all devices. Therefore, if the private key is ever compromised, it will compromise the devices that utilize this scheme.

Another level of security may include a common secret that may be utilized to provide authentication between devices. In this approach, the host device may encrypt commands that may somehow incorporate the common secret and the slave device may compare this value to its internally stored common secret to ensure that the command originates from an authorized source. However, while a common secret may be useful for helping to keep the details of key exchange secure, exposure of the common secret will compromise the devices.

Another approach may involve the use of a unique per device pair, sometimes known as "pairing", in order to ensure that for any given slave device there may a single master device. In many STB integrated circuits (ICs), an internal non-volatile memory, such as a one-time-programmable (OTP) or on-chip secure flash, for example, may be utilized to store secure root keys which may be unique for every chip. Utilizing this approach, both the host and slave devices may be programmed with the same secure root key. As a result, commands sent by the host device may be encrypted by, for example, some derivative of the secure root key. Since only a single master device has this key, the slave device may be assured that the command came from the single legitimate source.

However, "pairing" may have logistical and/or practical limitations. In most integrated circuit fabrication and assembly facilities, it may be very difficult to keep track of pairs of chips or devices throughout the manufacturing, validation, testing, and/or board mounting stages. Moreover, different types of chips, as the host and slave devices generally are, may be manufactured separately, and a large amount of time and expense may be used to keep track of pairs of devices from two separate fabrication processes and/or sources in order to enable a "pairing" scheme.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for command authentication to achieve a secure interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for command authentication to achieve a secure interface. Aspects of the invention may comprise command authentication between a host and a slave device in a multimedia system that may be achieved by on-the-fly pairing or by an automatic one-time-programming via a security processor. In an on-the-fly pairing scheme, the host may generate a host key based on a host root key and host control words while the slave may generate slave key based the host key, a slave root key and slave control words. The slave key may be stored and later retrieved by the slave device to obtain the host key for authenticating host commands. The host may be disabled from generating and/or passing the host key to the slave. In an automatic one-time-programming scheme, the security processor may burn a random number onto a one-time-programmable (OTP) memory in the host and slave devices for command authentication.

In an embodiment of the invention, a master device and a slave device may be integrated circuits that may be mounted onto a single circuit board utilized in a set-top-box (STB) operation and/or in other similar applications, for example. The master or host device may be utilized to remove network conditional access (CA) decryption from the incoming data and to re-encrypt the data utilizing a different algorithm such as a local copy-protection (CP) method, for example. The decrypted/re-encrypted data may be communicated to the slave device via a PCI memory transfer and/or a dedicated serial interface, for example. In some instances, a mailbox command protocol may be utilized between the host and the slave devices over a PCI bus, for example, to send command and/or to configure at least a portion of the slave device. In this regard, the communication of data between the master or host device and the slave device may require that the mailbox communication scheme provide a secure exchange, for example, commands on this interface may require encryption and may utilize at least a first level of protection against replay attacks. When processing commands, the slave device may be able to authenticate the source of the commands to ensure that it is a legitimate device. Master keys may be utilized to create final session keys for commands and/or CP data encryption/decryption, for example. In this regard, a secure method of passing the master keys between the host and slave devices may be implemented. Moreover, to protect from rogue devices tapping into or snooping on the common bus, unauthorized devices may not be able to access the slave device's internal registers and/or access the slave device's private memory, such as DRAM memory, for example, to read clear intermediate data.

Figure 1:
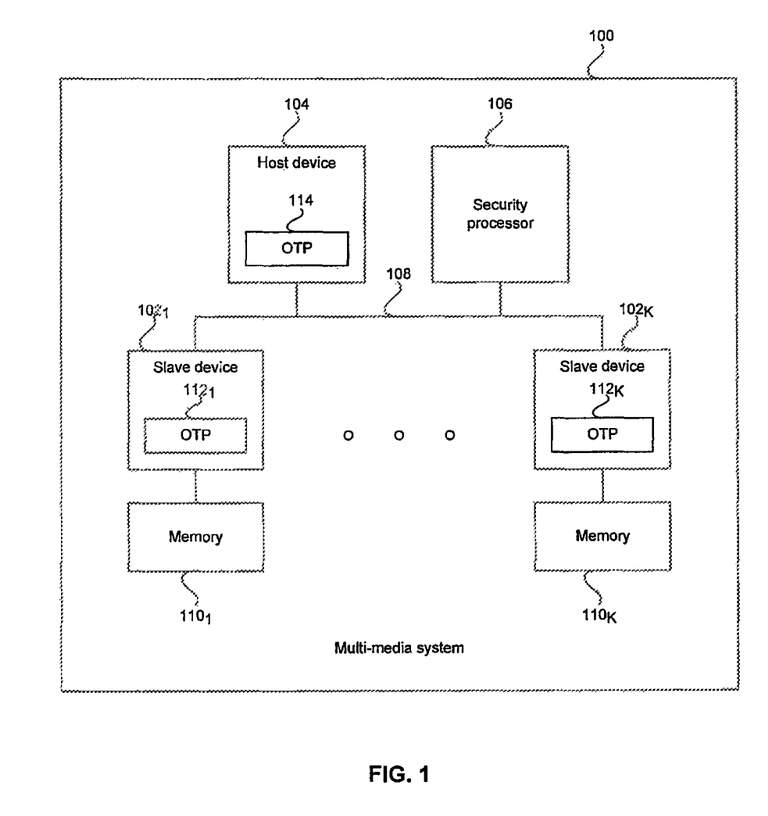
FIG. 1 is a block diagram illustrating an exemplary multimedia system, in accordance with an embodiment of the invention.

FIG. 1 is a block diagram illustrating an exemplary multimedia system, in accordance with an embodiment of the invention. Referring to FIG. 1, there is shown a multimedia system 100 that may comprise at least one slave device 102, a memory 110 associated with a slave device 102, a host device 104, a security processor 106, and a bus interface 108. The multimedia system 100 may be utilized in a set-top-box and/or other similar applications, for example. The bus interface 108 may be a PCI bus interface, for example. The slave device 102 may comprise a one-time-programmable memory 112. The host device 104 may comprise a one-time-programmable memory 114. In an exemplary embodiment of the multimedia system 100 shown in FIG. 1, the multimedia system 100 may comprise a plurality of slave devices $102_1, \ldots, 102_K$ that may be utilized with associated memories $110_1, \ldots, 110_K$, and corresponding one-time-programmable memories $112_1, \ldots, 112_K$. The host device 104, the slave devices $102_1, \ldots, 102_N$, the security processor 106, and/or the memories $110_1, \ldots, 110_K$ may be implemented as at least one integrated circuit (IC), for example.

The host device 104 may comprise suitable logic, circuitry, and/or code that may enable control and/or management of operations in the multimedia system 100. For example, the host device 104 may be utilized to generate and send commands to at least a portion of the components in the multimedia system 100 via a bus interface, such as the bus interface 108. In this regard, the host device 104 may also enable secure communication with at least a portion of the components in the multimedia system 100, such as the slave devices $102_1, \ldots, 102_K$, by utilizing command authentication schemes over the common bus interface. The host device 104 may support either or both an on-the-fly pairing command authentication operation and an automatic OTP key programming command authentication operation. The host 104 may also support other secure operations such as key exchange, prevention of replay attacks, and/or prevention of memory attacks, for example. The host OTP memory 114 within the host device 104 may comprise suitable logic, circuitry, and/or code that may enable storage of information that may be utilized for supporting command authentication operations.

The slave devices $102_1, \ldots, 102_K$ may each comprise suitable logic, circuitry, and/or code that may enable processing of audio and/or video data in the multimedia system 100. The slave devices $102_1, \ldots, 102_K$ may receive commands for processing audio and/or video data and may require some guarantee that the commands received originate from an authorized source. For example, when receiving commands from, for example, the host device 104, the slave devices $102_1, \ldots, 102_K$ may support authentication of the received commands based on either or both an on-the-fly pairing command authentication operation and an automatic OTP key programming command authentication operation. The slave OTP memories $112_1, \ldots, 112_K$ within a slave devices $102_1, \ldots, 102_K$ may comprise suitable logic, circuitry, and/or code that may enable storage of information that may be utilized for supporting command authentication operations.

The memories $110_1, \ldots, 110_K$ may comprise suitable logic, circuitry, and/or code that may enable storage of data associated with the operations performed by the slave devices $102_1, \ldots, 102_K$. For example, for command authentication operations, the memories $110_1, \ldots, 110_K$ may be utilized for storage of data, such as encoding and/or decoding keys, for example, that may be necessary to authenticate that commands received by the slave devices $102_1, \ldots, 102_K$ were sent from an authorized source, such as the host device 104. In some instances, the memories $110_1, \ldots, 110_K$ may be portions of a single or multiple memory devices, such as a FLASH memory, for example.

The security processor 106 may comprise suitable logic, circuitry, and/or code that may enable providing security operations to the multimedia system 100. For example, the security processor 106 may support command authentication operations to protect the data processed and the operations performed by the slave devices $102_1, \ldots, 102_K$ from being accessed by unauthorized sources. In this regard, the security processor 106 may support either or both an on-the-fly pairing command authentication operation and an automatic OTP key programming command authentication operation in the slave devices $102_1, \ldots, 102_K$. The security processor 106 may also support security operations that control data and/or command access to at least a portion of the components in the multimedia system 100.

Figure 2:
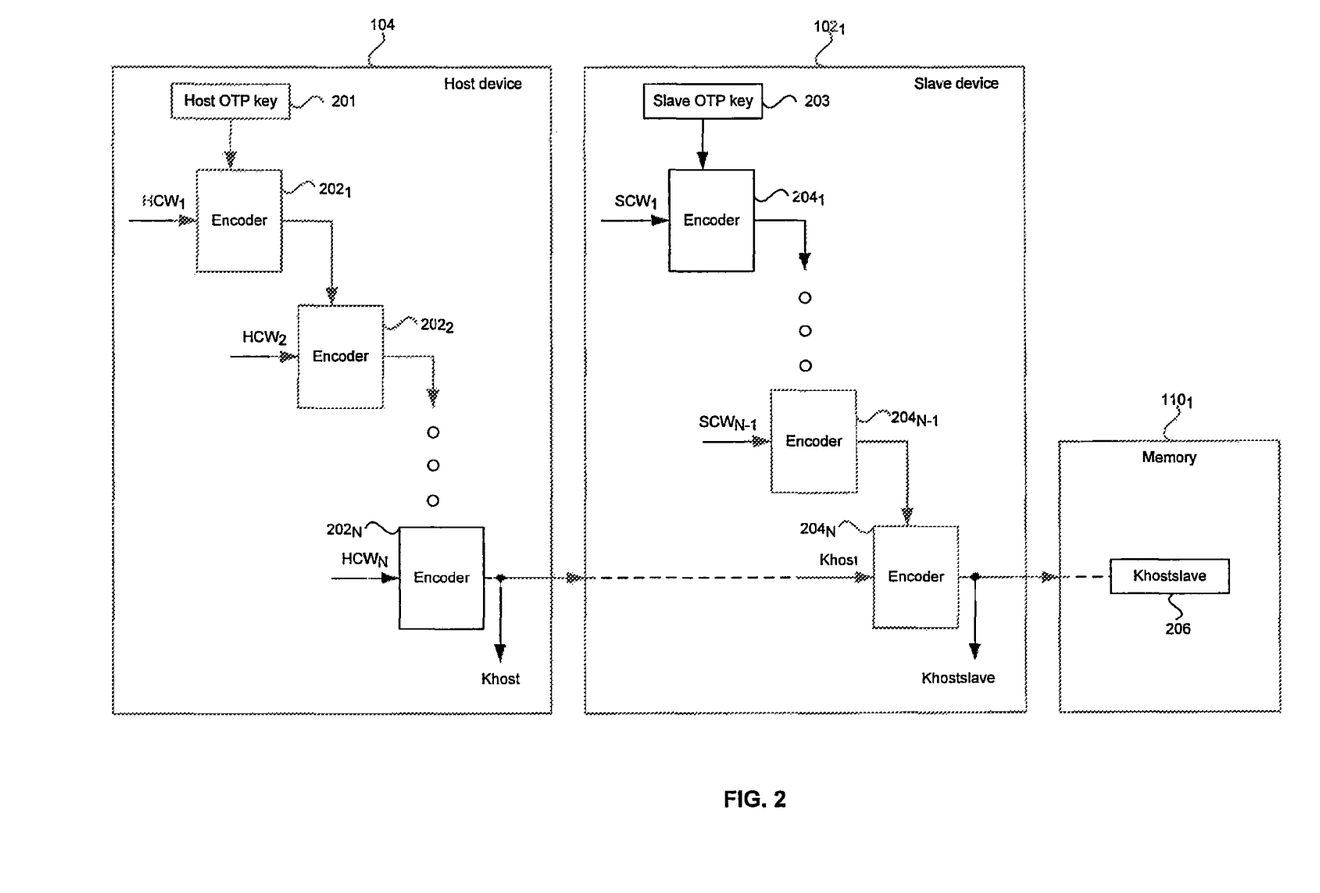
FIG. 2 is a block diagram illustrating exemplary multimedia system components for generating a common secure key utilizing on-the-fly pairing command authentication, in accordance with an embodiment of the invention.

FIG. 2 is a block diagram illustrating exemplary multimedia system components for generating a common secure key utilizing on-the-fly pairing command authentication, in accordance with an embodiment of the invention. Referring to FIG. 2, there is shown the host device 104, a slave device $102_1$ and its associated memory $110_1$. The host device 104 may comprise a host OTP root key (OTPhost) 201 that may be stored within, for example, the host OTP memory 114 as disclosed in FIG. 1. The host device 104 may also utilize a plurality of host control words $HCW_1, \ldots, HCW_N$, and a plurality of encoders $202_1, \ldots, 202_N$. The plurality of encoders $202_1, \ldots, 202_N$ may comprise suitable logic, circuitry, and/or code that may enable encryption operations for implementing a key ladder, such as a cipher operated in a recursive manner, for example, that may be utilized for multiple encryption of user-specific host control words with derivatives of the host OTP root key 201 to generate a final derivative value or host key, Khost. The host device 104 may receive at least one signal, which may facilitate generation of the host key, Khost, based on the host OTP root key 201 stored within the host device 104, for example. The host device 104 may also receive at least one signal to pass the host key, Khost, to the slave device $102_1$, for example.

The slave device $102_1$ may comprise a slave OTP root key (OTPslave) 203 that may be stored within, for example, the slave OTP memory $112_1$ as disclosed in FIG. 1. The slave device $102_1$ may also utilize a plurality of slave control words $SCW_1, \ldots, SCW_{N-1}$, and a plurality of encoders $204_1, \ldots, 204_N$. The plurality of encoders $204_1, \ldots, 204_N$ may comprise suitable logic, circuitry, and/or code that may enable a key ladder, such as a cipher operated in a recursive manner, for example, that may be utilized for multiple encryption of user-specific slave control words and the host key, Khost, with derivatives of the slave OTP root key 203 to generate a final derivative value or slave key, Khostslave. The slave device $102_a$ may receive at least one signal, which may facilitate generation of the slave key, Khostslave, based on the slave OTP root key 203 stored within the slave device $102_1$ and the passed host key, Khost. The slave device $102_1$ may also receive at least one signal, which may facilitate passing of the slave key, Khostslave, to the memory $110_1$ for storage, for example. The memory $110_1$ may comprise a portion 206 for storage of the slave key, Khostslave, generated by the slave device $102_1$. Notwithstanding the exemplary embodiment disclosed in FIG. 2, on-the-fly pairing may be implemented between the host device 104 and more than one of the slave devices $102_1, \ldots, 102_K$.

The key ladder utilized by the host device 104 and/or the slave device $102_1$ may allow the OTP root key to encrypt user specified data, such as the secret control words (i.e. secret values), which is in turn used as the key for the next stage encryption operation. In this regard, key ladders may have more than one encryption level in order to allow a final key to have a proper crypto-distance from the OTP root key. Moreover, the key ladder may allow the final stage to go to a readable register/memory, so that software may access the final derivative key.

Figure 3:
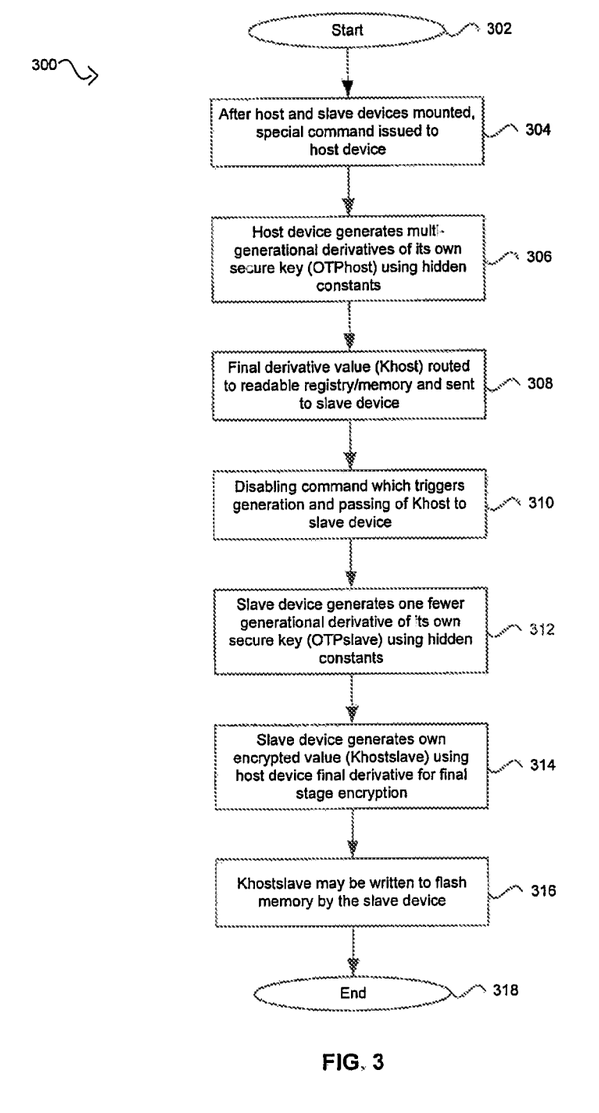
FIG. 3 is a flow diagram illustrating exemplary steps for generating a common secure key utilizing on-the-fly pairing command authentication, in accordance with an embodiment of the invention.

FIG. 3 is a flow diagram illustrating exemplary steps for generating a common secure key utilizing on-the-fly pairing command authentication, in accordance with an embodiment of the invention. Referring to FIG. 3, there is shown a flow diagram 300. In step 304, after start step 302, during manufacturing, assembling, and/or testing of at least a portion of a multimedia system 100, when the integrated circuits corresponding to the host device 104 and the slave devices $102_1, \ldots, 102_K$ have been mounted on a circuit board, a special command or signal may be communicated to the host device 104, which may facilitate generation and/or passing of the host key, Khost, to at least one of the slave devices $102_1, \ldots, 102_K$. In step 306, the special command or signal enables the host device 104 to generate multi-generational derivatives of the host OTP root key 201, OTPhost, using host control words that may be stored in the host device 104. For example, N derivatives of the OTPhost may be generated by utilizing the host control words $HCW_1, \ldots, HCW_N$. The final derivative value or host key, Khost, may be generated based on the following expression:

$$K_{host} = F(OTP_{host}, HCW_1, HCW_2, \ldots, HCW_N),$$

where the function F( ) corresponds to the recursive cipher key ladder implemented utilizing the encoders $202_1, \ldots, 202_N$.

In step 308, the final derivative value or host key, Khost, may be routed to a readable register/memory within the host device 104 and may be sent to at least one of the slave devices $102_1, \ldots, 102_K$. In step 310, at least one command or signal may be generated to disable the host device 104 from subsequent generations and/or passings of the host key, Khost, to the slave devices $102_1, \ldots, 102_K$. In step 312, at least one command or signal may be generated to indicate to at least one of the slave devices $102_1, \ldots, 102_K$ to generate corresponding slave keys, Khostslave, based on the slave OTP root key 203, OTPslave, stored within a slave OTP memory. In this regard, N−1 derivatives of the OTPslave may be generated by utilizing the slave control words $SCW_1, \ldots, SCW_{N-1}$. The slave control words may be different than the host control words. In step 314, the slave device may generate a final derivative value or slave key, Khostslave, based on the host key, Khost, during a final stage of encryption. The final derivative value or slave key, Khostslave, may be generated based on the following expression:

$$K_{hostslave} = F(OTP_{slave}, SCW_1, SCW_2, SCW_{N-1}, Khost),$$

where the function F( ) corresponds to the recursive cipher key ladder implemented utilizing the encoders $204_1, \ldots,$ $204_N$. In step 316, the slave key, Khostslave, may be written to a corresponding memory, such as the memories $110_1, \ldots, 110_K$ that may be FLASH memories, for example. After step 316 the process may proceed to end step 318, for example.

The passing of host key, Khost, to the slave device may not be sufficiently secure, since it may expose the root value. However, by disabling the host device 104 as disclosed in step 310, the passing of the host key, Khost, may be performed once during manufacturing, assembling, and/or testing. In this regard, a command or signal may disable the generation and/or passing of the host key, Khost, by disabling or setting at least one OTP bit in the host OTP memory 114. The value of slave key, Khostslave, in memory may not be altered by an attacker or unauthorized user because commands to the slave devices $102_1, \ldots, 102_K$ may not be authenticated.

Figure 4:
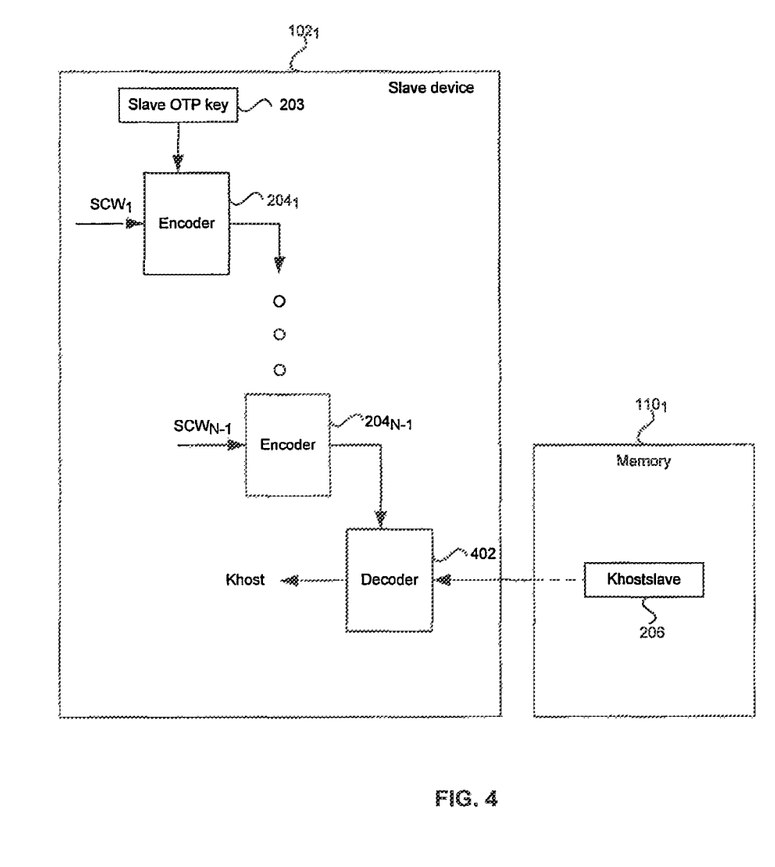
FIG. 4 is a block diagram illustrating exemplary multimedia system components for decoding a common secure key to enable on-the-fly pairing command authentication, in accordance with an embodiment of the invention.

FIG. 4 is a block diagram illustrating exemplary multimedia system components for decoding a common secure key to enable on-the-fly pairing command authentication, in accordance with an embodiment of the invention. Referring to FIG. 4, there is shown the slave device $102_1$ and the memory $110_1$ as disclosed in FIG. 2. The slave device $102_1$ may comprise the slave OTP root key (OTPslave) 203 that may be stored within, for example, the slave OTP memory $112_1$ as disclosed in FIG. 1, and a plurality of encoders $204_1, \ldots, 204_{N-1}$. The slave device $102_1$ may also comprise a decoder 402 that may comprise suitable logic, circuitry, and/or code that may enable a key ladder, such as a cipher operated in a recursive manner, for example, that may be utilized for decrypting or decoding the host key, Khost, with derivatives of the slave OTP root key 203 based on the slave key, Khostslave, stored in the portion 206 of the memory $110_1$. The decoded host key, Khost, may be utilized to decrypt and authenticate host commands that are received by the slave device $102_1$. Notwithstanding the exemplary embodiment disclosed in FIG. 4, decoding of a common secure key for on-the-fly pairing authentication operations may be performed by more than one of the slave devices $102_1, \ldots, 102_K$.

Figure 5:
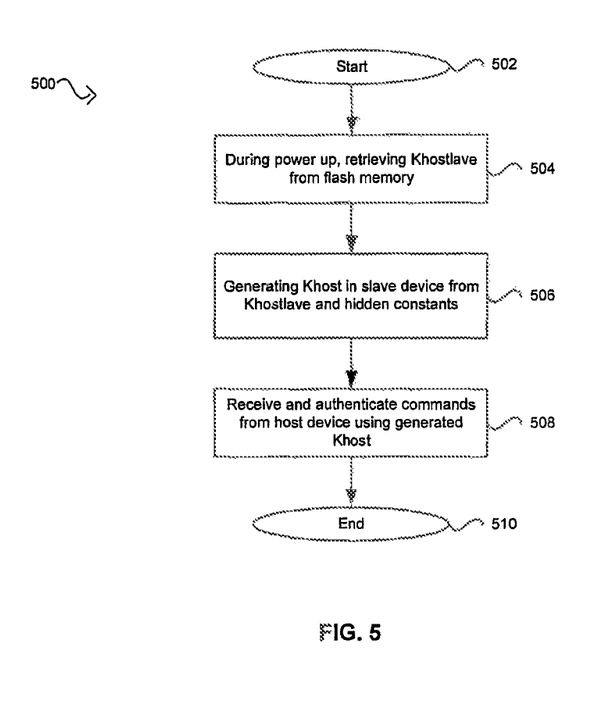
FIG. 5 is a flow diagram illustrating exemplary steps for decoding a common secure key utilizing on-the-fly pairing command authentication, in accordance with an embodiment of the invention.

FIG. 5 is a flow diagram illustrating exemplary steps for decoding a common secure key utilizing on-the-fly pairing command authentication, in accordance with an embodiment of the invention. Referring to FIG. 5, there is shown a flow diagram 500. In step 504, after start step 502, when the multimedia system 100 is powered up, a slave device, such as the slave device $102_1$, for example, may read the slave key, Khostslave, from the corresponding memory, which may be a FLASH memory, for example. In step 506, the slave device may then utilize hidden constants, such as the slave control words $SCW_1, SCW_2, \ldots, SCW_{N-1}$, for example, to obtain the host key, Khost, by performing a decryption operation on the slave key, Khostslave, during the final stage of the recursive cipher key ladder. In step 508, commands received from the host device, such as the host device 104, may be authenticated since the host key, Khost, may be known to both the host and stave devices and the host key, Khost, has not been exposed since the passing to the slave device during manufacturing, assembling, and/or testing of at least a portion of a multimedia system 100 as disclosed in FIGS. 3-4.

Figure 6:
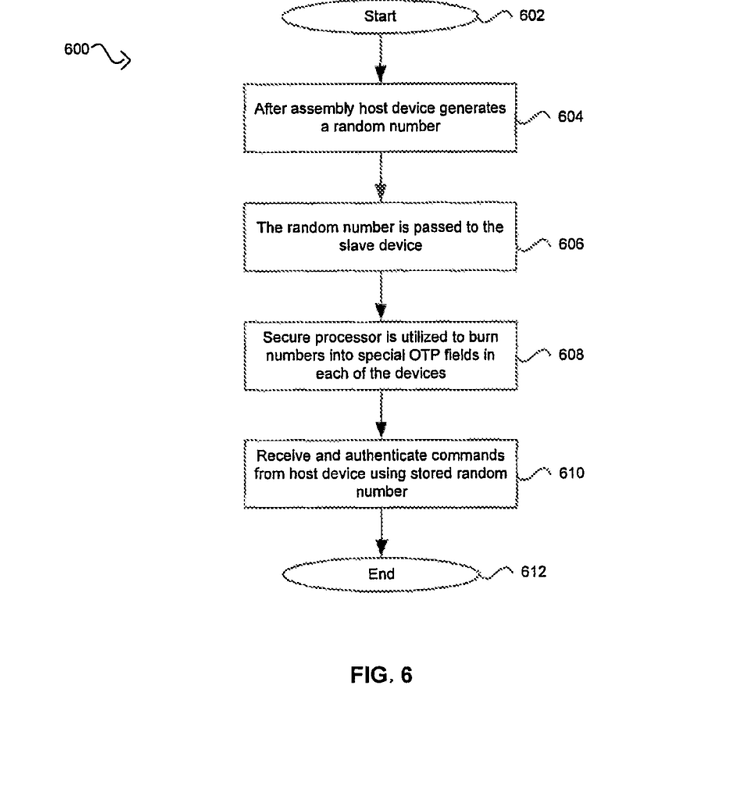
FIG. 6 is a flow diagram illustrating exemplary steps for generating a common secure key utilizing automatic one-time-programmable key programming by utilizing a security processor, in accordance with an embodiment of the invention.

FIG. 6 is a flow diagram illustrating exemplary steps for generating a common secure key utilizing automatic OTP key programming by utilizing a security processor, in accordance with an embodiment of the invention. Referring to FIG. 6, there is shown a flow diagram 600 that may be correspond to a pairing scheme that may not require tracking parts in the field by utilizing automatic burning of symmetric OTP keys by a security processor. In step 604, after start step 602, the host device 104 in the multimedia system 100 disclosed in FIG. 1 may be utilized to generate a random number during manufacturing, assembling, and/or testing of at least a portion of a multimedia system 100. In this regard, at least one command or signal may be generated, which may function as an indication to the host device 104 to generate the random number.

In step 606, the generated random number may be passed to at least one slave device, such as the slave devices $102_1, \ldots, 102_K$ in the multimedia system 100, that may be communicatively coupled to the host device 104 via, for example, the bus interface 108 disclosed in FIG. 1. In this regard, at least one command or signal may be generated to indicate to the host device 104 to pass or communicate the random number to a slave device. In step 608, a security processor, such as the security processor 106 disclosed in FIG. 1, that may be communicatively coupled to the host device 104 and at least one slave device via the bus interface 108, may be utilized to burn or program the generated random number into specified OTP fields within the OTP memories in each of the devices. In this regard, the random numbers may be utilized as a common secure key or utilized to generate a common secure key for command authentication operations.

In step 610, the host device 104 may encrypt commands to be communicated to the devices $102_1, \ldots, 102_K$ using at least one derivative of the generated random number. In this regard, the automatic OTP key programming approach for command authentication may be secure since no key exchange may be necessary to obtain the root key since both keys have already been programmed into the devices. Moreover, lower level keys may also generated based on this approach.

Notwithstanding the embodiment of the invention disclosed in FIG. 6, the automatic OTP key programming approach may also be applied for asymmetric OTP keys when the security processor is enabled of generating asymmetric key pairs, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure communication, the method comprising:
receiving from a first device, in a second device, a first device key that is generated by said first device based on a first device root key and at least one secret value stored within said first device, wherein said first device is configured to generate said first device key only once;
generating, by said second device, a second device key based on said received first device key, a second device root key, and at least one secret value stored within said second device; and
authenticating by said second device, commands received from said first device utilizing said generated second device key.

2. The method according to claim 1, further comprising storing said generated second device key in a memory communicatively coupled to said second device.

3. The method according to claim 2, further comprising retrieving said stored generated second device key from said memory after power up.

4. The method according to claim 3, further comprising authenticating commands from said first device in said second device by decoding said first device key from said retrieved generated second device key.

5. The method according to claim 1, wherein said first device is prevented from generating another first device key after said first device key is generated by said first device.

6. The method according to claim 1, wherein said first device key is generated by said first device based on at least one derivative of said first device root key.

7. The method according to claim 1, comprising generating said second device key based on at least one derivative of said second device root key.

8. A system for secure communication, the system comprising:
a first device configured to generate a first device key based on a first device root key and at least one secret value stored within said first device, wherein said first device key is generated only once; and
a second device communicatively coupled to said first device, wherein said second device is configured to:
receive said first device key from said first device;
generate a second device key based on said first device key, a second device root key, and at least one secret value stored within said second device; and
authenticate commands received from said first device using said generated second device key.

9. The system according to claim 8, wherein said second device enables storage of said generated second device key in a memory communicatively coupled to said second device.

10. The system according to claim 9, wherein said second device enables retrieval of said stored generated second device key from said memory after power up.

11. The system according to claim 10, wherein said second device authenticates commands from said first device by decoding said first device key from said retrieved generated second device key.

12. The system according to claim 8, wherein said first device is prevented from generating another first device key after said first device generates said first device key.

13. The system according to claim 8, wherein said first device generates said first device key based on at least one derivative of said first device root key.

14. The system according to claim 8, wherein said second device enables generation of said second device key based on at least one derivative of said second device root key.

15. A device for secure communication, the device comprising:
a first memory storing at least one secret value;
a second memory storing a first device root key;
an interface coupled to a second device, the interface configured to receive a second device key from said second device over a bus, wherein said second device key is based upon a second device root key, and at least one secret value stored within said second device;
an encoder coupled to the interface, configured to generate a first device key based on said received second device key, said first device root key, and said at least one secret value; and
a decoder configured to authenticate commands received from said second device using said generated first device key.

16. The system according to claim 15, wherein said second device enables storage of said generated second device key in a memory communicatively coupled to said second device.

17. The system according to claim 16, wherein said second device enables retrieval of said stored generated second device key from said memory after power up.

18. The device according to claim 17, wherein said second device enables authentication of commands from said first device by decoding said first device key from said retrieved generated second device key.

19. The device according to claim 15, wherein said first device is prevented from generating another first device key after said first device generates said first device key.

20. The system according to claim 15, wherein said first device key is generated by said second device based on at least one derivative of said second root key.

21. The system according to claim 15, wherein said second device enables generation of said second device key based on at least one derivative of said second root key.

* * * * *

UNITED STATES PATENT AND TRADEMARK OFFICE
CERTIFICATE OF CORRECTION

PATENT NO. : 8,762,719 B2  
APPLICATION NO. : 13/614834  
DATED : June 24, 2014  
INVENTOR(S) : Rodgers et al.

Page 1 of 1

It is certified that error appears in the above-identified patent and that said Letters Patent is hereby corrected as shown below:

In the Claims:

Column 10, line 33, please replace "The system according to claim 15," with --The device according to claim 15,--.

Column 10, line 36, please replace "The system according to claim 16," with --The device according to claim 16,--.

Column 10, line 46, please replace "The system according to claim 15," with --The device according to claim 15,--.

Column 10, line 49, please replace "The system according to claim 15," with --The device according to claim 15,--.

Signed and Sealed this  
Fourteenth Day of October, 2014

Michelle K. Lee  
*Deputy Director of the United States Patent and Trademark Office*